Jan. 9, 1951     W. P. OEHLER     2,537,543
TOWED PLANTER MARKER
Filed Jan. 6, 1945            2 Sheets—Sheet 1
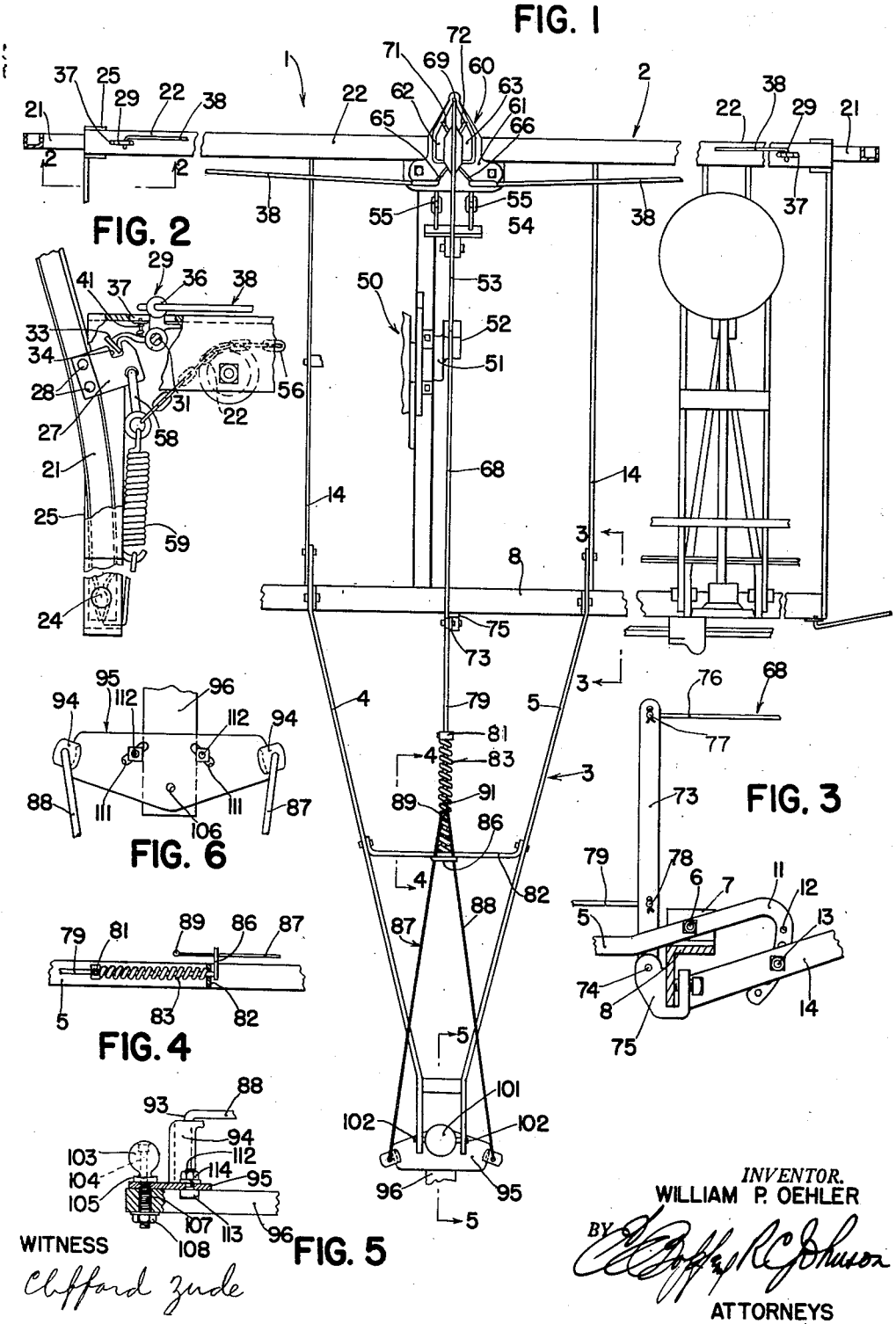
WITNESS
INVENTOR.
WILLIAM P. OEHLER
BY
ATTORNEYS Jan. 9, 1951  W. P. OEHLER  2,537,543
TOWED PLANTER MARKER
Filed Jan. 6, 1945  2 Sheets-Sheet 2
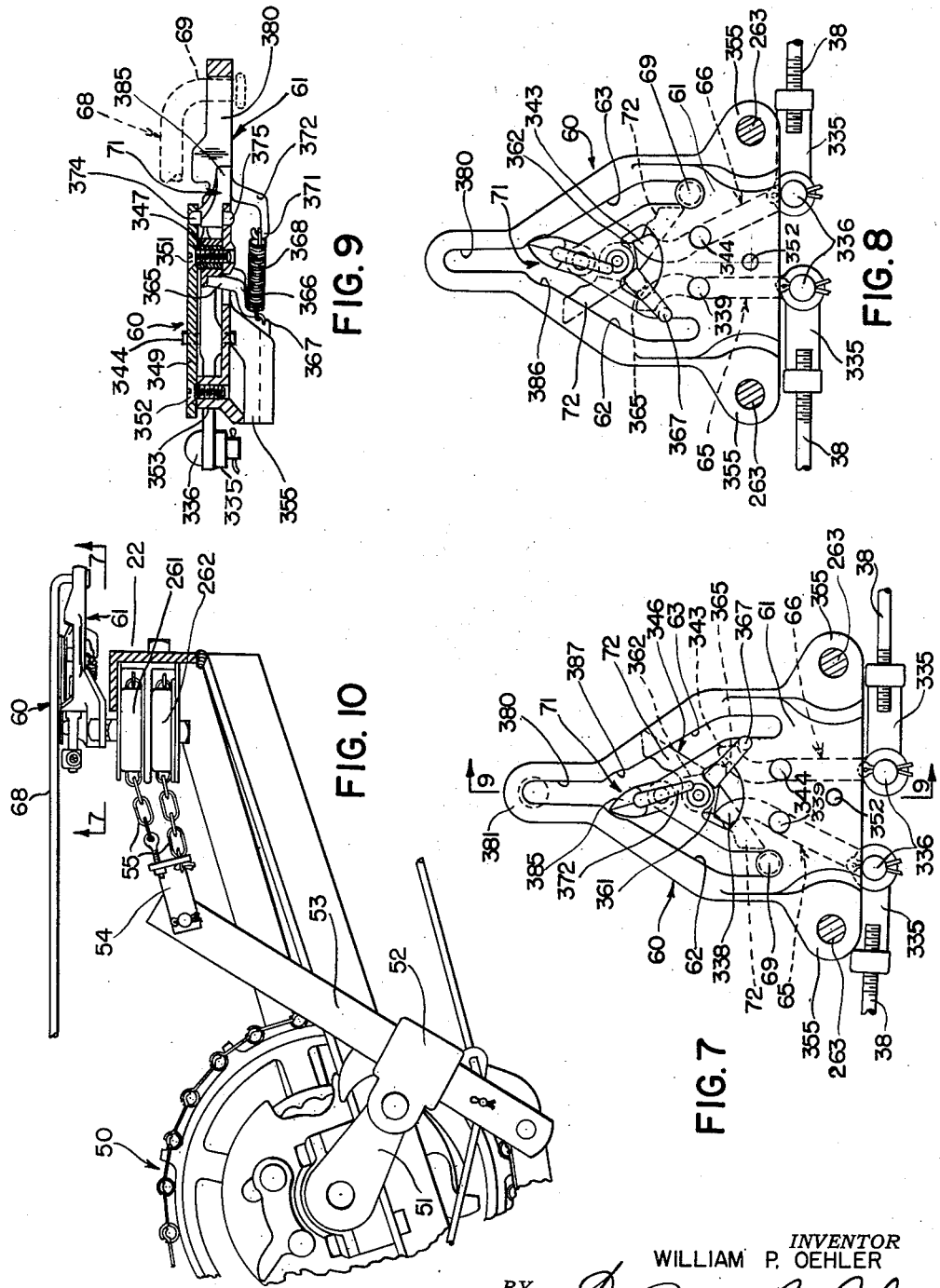
INVENTOR
WILLIAM P. OEHLER
BY
ATTORNEYS Patented Jan. 9, 1951

2,537,543

UNITED STATES PATENT OFFICE 2,537,543

TOWED PLANTER MARKER

William P. Oehler, Moline, Ill., assignor to Deere & Company, Moline, Ill., a corporation of Illinois Application January 6, 1945, Serial No. 571,684

12 Claims. (Cl. 97—230)

The present invention relates generally to agricultural implements and more particularly to planters.

The object and general nature of the present invention is the provision of a tractor propelled planter wherein the markers are controlled by the turning of the tractor relative to the planter. Heretofore, tractor planters having markers have been constructed so that the markers are controlled by a raising and lowering of the planter shoes or furrow openers. For example, in the co-pending application Serial No. 385,977, filed March 31, 1941 by Charles H. White, now United States Letters Patent No. 2,376,464, dated May 22, 1945, there is shown a marker control mechanism of the type in which latch means holds both markers in an elevated position, with the latches alternately being released by successive operations of the raising and lowering means. However, it is sometimes desirable to be able to raise and lower the planter shoes without having the markers reversed. With this in mind, the principal feature of the present invention is the provision of a marker control that is actuated by the turning of the tractor, in either direction, through a given extent for operating the marker controls.

These and other objects of the present invention will be apparent to those skilled in the art after a consideration of the following detailed description, taken in conjunction with the accompanying drawings in which one preferred form of the invention has been illustrated.

In the drawings:

Figure 1 is a fragmentary plan view of the tractor planter of the towed type, in which the principles of the present invention have been incorporated.

Figure 2 is a fragmentary detail view, taken generally along the line 2—2 of Figure 1, showing the manner in which the marker arms are supported and controlled.

Figure 3 is a view taken generally along the line 3—3 of Figure 1, showing the relation between the intermediate marker latch control lever and the pivoted tractor hitch.

Figure 4 is a detail view taken generally along the line 4—4 of Figure 1, showing the lost motion connection between the turning links and the member that operates the latch control.

Figure 5 is a detail view taken generally along the line 5—5 of Figure 1.

Figure 6 is a fragmentary plan view of the turning bar, showing in particular, in connection with Figure 5, the manner in which the tractor drawbar is held in rigid relationship with respect to the turning bar.

Figures 7, 8, 9 and 10 are detail views of the marker latch control unit, Figure 7 being a section taken along the line 7—7 of Figure 10 and Figure 9 being a section taken generally along the line 9—9 of Figure 7.

Referring first to Figure 1, the planter which is indicated in its entirety by the reference numeral 1 is substantially the same as shown in the above-mentioned White patent, embodying a generally rectangular frame 2 supported by ground wheels (not shown) and a hitch or draft frame 3 compriisng generally longitudinally extending bars 4 and 5 pivoted, as at 6 (Figure 3), to brackets 7 carried on the front angle 8 of the main frame 1. The rear end of the hitch frame bars 4 and 5 curves downwardly, as indicated at 11, Figure 3, and is provided with a plurality of apertures 12. Bolts 13 pass through the selected aperture 12 and an aperture in an adjacent frame crossbar 14. By disposing the bolts 13 in different apertures 12 the relation between the hitch frame 3 and the planter frame 1 may be adapted, as, for example, to raise or lower the front end of the hitch frame, which is a point connected to the propelling tractor.

A marker arm 21 is disposed at each end of the frame 1, preferably in the vertical lateral plane of the rear main frame angle 22. The pivotal support of the marker arms 21 is best shown in Figure 2, both marker arms being mounted in substantially the same way, and hence a description of one of the mountings will suffice. Referring now to Figure 2, the inner end of the marker arm 21 is apertured to receive a pivot pin 24, the latter being carried at the lower end of a standard 25. The upper end of the latter is fixed in any suitable manner to the outer end of the rear frame angle 22. A latch bracket 27 is secured, as by rivets 28 or the like, to the marker arm 21 at a point thereof adjacent the end of the frame angle 22 when the marker arm is raised, which is the position shown in Figure 2. A marker arm latch 29 is pivotally mounted on a bolt 31 carried by the main frame angle 22 and is provided with a detent 33 that is adapted to engage in a notch 34 formed in the marker bracket 27. The marker latch 29 also includes an end 36 that extends upwardly through a slot 37 formed in the horizontal flange of the main frame angle 22, the end 36 being apertured to receive the laterally bent end of the associated latch controlling rod 38. A spring 41 bears at one end against the horizontal flange of the angle 22 and at the other end against the detent 33, tending to cause the latter to engage the notch in the bracket 27. The spring 41 thus serves as means biasing the latch 29 for engagement in the marker bracket notch 34.

The planter is equipped with a power lift unit indicated fragmentarily by the reference numeral 50. The power lift unit preferably is traction driven and may be of any suitable construction, preferably like that shown in the White patent identified above. Briefly, the power lift unit 50 includes a crank arm 51 carrying a block 52 in which a swinging link 53 is disposed, this linkage being preferably in the form of a Whitworth quick return linkage. The arm 53 carries a plate 54 to which a plurality of chains 55 are connected. The chains 55 are carried laterally outwardly along the main frame angle 22 and are connected with the rear ends of the several furrow openers (not shown). Thus, the operation of the power unit 50 serves to raise and lower the furrow openers. A marker arm lifting chain 56 (Figure 2) is connected at its inner end to the adjacent lifting chain 55 and at its outer end is connected to a link 58 which, with a spring 59, forms a cushioned connection between the marker arm lifting chain 56 and associated marker arm. When the lifting arm 53 is swung forwardly to raise the furrow openers both marker arms 21 are also raised, the latches 33 moving into the associated notches 34 for locking the marker arms in their raised position.

In operation, it is desirable to lower only one of the marker arms, namely, the marker arm at the side of planter adjacent the unplanted ground. Therefore, the planter is equipped with marker latch control means which at the proper time releases one or the other of the associated marker latches for dropping the associated marker arm into its working position. This type of marker latch control is disclosed in detail in the above-mentioned patent to which reference may be made if necessary.

Referring now to Figures 1, 7, 8 and 9, the marker latch control unit is indicated in its entirety by the reference numeral 60. The inner end of each of the latch controlling rods 38 is threaded into a marker latch rod casting 335, each of which receives a pivot pin 336. A latch rod pull lever 65 is provided with an opening at one end to receive the pin 336 and is also provided with a pair of lugs 339 by which the pull lever 65 is mounted for limited swinging movement in a marker control bracket 61. Another latch rod pull lever 66 is provided with an opening at one end to receive the pin 336 of a latch rod 38 (on the right as viewed in Figure 1) and is also provided with a pair of lugs 344 by which the lever 66 is mounted in the bracket 61 alongside the left hand latch rod pull lever 65. The end of each of the levers 65 and 66 opposite the end receiving the associated pin 336 is curved, as at 338 and 343. These curved ends cooperate with a T-shaped marker trip cam member 346. The member 346 is mounted for rocking movement on a bushing 347 that is clamped between an upper bracket plate 349 and the central portion of the bracket 61 by means of a screw 351. The upper plate 349 is secured by a similar screw 352 to a lug 353 carried by or formed on the bracket 61, the lug 353 and the bushing 347 serve as spacing means disposing the plate 349 a distance above the body of the bracket 61. The latter is provided with a pair of ears 355 by which it is secured to the upper ends of the bolts 263 on which chain sheaves 261 and 262, receiving the lifting chains 55, are mounted. By this means the bracket 61 is fixed to the central portion of the rear frame angle 22. If desired, however, the bracket 61 may be bolted directly to the angle 22.

Referring again to Figures 7 and 8, the cam member 346 is provided with a pair of arms, each of which is indicated by the reference numeral 72, extending generally in diametrically opposed relation, and a pair of shoulders 361 and 362, the shoulders being adapted to engage the curved ends 338 and 343, respectively. A third shoulder 365 (Figure 9) is formed on the cam member 346 generally midway between the shoulders 361 and 362, and the shoulder 365 is adapted to engage either one or the other of the curved pull lever ends 338 and 343. An arm 366 extends downwardly and generally radially outwardly and has a hook end 367 formed thereon and adapted to receive one end of a spring 368 (Figure 9), the opposite end of which is adapted to engage over the hook end 371 of a similarly extending arm 372 formed on the lower portion of a marker control reversing swivel or selecting trigger 71. The latter member is provided with upper and lower studs 374 and 375 adapted to be received in suitably formed openings in the upper plate 349 and the adjacent portion of the central part of the bracket 61, as best shown in Figure 9. From Figures 7 and 8 it will be seen that the swivel arm 372 extends over the axis defined by the pivot studs 374 and 375.

The bracket 61 is generally triangular in shape and is formed with a slot 380 extending from the tip 381 of the bracket 61 forwardly to a point adjacent the pivot axis of the reversing swivel 71, at which point the slot 380 forms two branches 62 and 63. As best shown in Figures 7 and 8, the two arms 72 of the cam member 346, pass over the slots 62 and 63. The reversing swivel 71 has a nose 385 which is formed to swing from one side to the other of the forward portion of the slot 380, and to this end the bracket 61 is provided with a pair of recesses 386 and 387. A marker control actuating rod 68 (Figure 1) is provided with a downturned end 69 that is disposed in the slot 380 and is shiftable alternately into the slots 62 and 63 for controlling the marker latches, depending on the position of the selecting trigger.

The present invention is more particularly concerned with the provision of a new and improved means for operating the control member 68, or more exactly, the marker control unit 60, according to the turning of the tractor, as at the end of the field, relative to the planter, rather than the operation of the lifting mechanism, as heretofore. The rod 68 is extended forwardly, as at 76 (Figure 3), and has a laterally turned end 77 disposed in an opening in the upper end of a rocking lever 73, the lower end of which is pivoted, as at 74, to a bracket 75 that is clamped or otherwise fixed to the frame angle 8. At a point adjacent the pivot 74, the lever 73 is apertured to receive the laterally turned end 78 of a forwardly extending rod 79. The latter extends forwardly, as shown in Figure 4, and has mounted thereon a set screw collar 81. Between the latter and a cross brace 82 a spring 83 is disposed. Thus, after the member 68 is pulled forwardly, passing forwardly in either slot 62 or slot 63, and released, the spring 83 will force the member 68 rearwardly until the end 69 rests in the rear portion of the bracket 61, as shown in Figure 1. A plate 86 is fixed to the front end of the rod 79 and in front of the cross brace 82 through which the rod 79 is slidable. The upper part of the plate 86 is provided with a pair of apertures through which a pair of links 87 and 88 extend, respectively. Abutments 89 and 91 are fixed to the rear ends of the rods 87 and 88 and provide for a certain amount of lost motion which accommodates forward movement of either of the rods 87 and 88 relative to the plate 86 without causing any movement of the latter or the rod 79 connected thereto.

The forward ends of the links 87 and 88 are turned downwardly, as shown at 93 in Figure 5, and the forward end of each link 87 and 88 is pivotally connected to the upper portion of a bracket 94 which is secured, as by welding, to a plate 95 forming a turning bar that is adapted to be fixed to the drawbar 96 of the tractor that propels the planter. The forward ends of the hitch bars 4 and 5 converge and are apertured at their front ends to receive a socket member 101 connected to the bars 4 and 5 by trunnions 102 that extend into said apertures. The socket member 101 seats over a ball 103, see Figure 5, the ball being apertured to receive a bolt 104 which extends down through the base 105 of the ball and is threaded through an opening 106 in the plate 95 and passes downwardly through an opening 107 in the rear end of the tractor drawbar 96. A nut 108 when tightened serves to secure the plate 95 fixedly to the tractor drawbar 96. To insure that the turning bar or plate 95 will remain in fixed relation with respect to the tractor drawbar 96, the plate 95 is provided with a pair of diagonal slots 111 in each of which a bolt 112 is placed. As shown in Figure 5, the heads 113 of the bolts being disposed up against and serving as stop means for the sides of the tractor drawbar 96, as best shown in Figure 6, and thus holding the turning bar 95 against movement relative to the drawbar. Various widths of drawbars are accommodated by loosening the bolts 112 and sliding them in the slots 111. If desired, of course, the bolts may be reversed from the position shown in Figure 5, that is, the heads could be on top of the turning bar 95 and the nuts 114 on the lower side, and serve in the same capacity as stops that are adjustable.

The operation of the marker control described above is substantially as follows.

When the outfit is moving straight ahead the parts occupy the positions shown in Figure 1. It will be seen that the stop abutments 89 and 91 are disposed a considerable distance rearwardly of the abutment plate 86 on the front end of the pull rod 79. This accommodates all normal weaving of the tractor relative to the planter without actuating the latch control unit 60. However, as at the end of the field, when the tractor is turned a certain amount such as from 45 to 60 degrees, for example, relative to the planter, one or the other of the abutments 89 and 91 comes up against the plate 86 and pulls the rod 79 forwardly. As best shown in Figure 3, this swings the intermediate lever 73 forwardly, actuating the pull rod 68 and causing the rear end 69 thereof to be advanced in one or the other of the slots 62 and 63, which action serves to swing one or the other of the arms 65 and 66 inwardly. This exerts a pull on the associated link 38 and, as best shown in Figure 2, releases the associated latch 33 from the marker arm, releasing the latter and permitting it to drop by gravity into its operating position. It will be understood that immediately prior to turning the outfit at the end of the field, the furrow openers are raised by the planter lifting mechanism, and thus raised, both marker arms are held then in their raised position. Whenever the rear end 69 of the rod 68 moves rearwardly, into the position shown in Figure 1, one of the latch controlling arms 65 and 66 is left in a position (Figure 2) engaging the other marker arm and holding it raised, even though the member 54 is moved rearwardly to lower the furrow openers and the unlatched marker arm. As long as the tractor is not turned through too great a degree, the planter lifting mechanism may be actuated as many times as desired, as may be necessary when crossing grass strips, terraces and the like, without effecting any reversal of the marker arm latches, yet when, as at the end of the field, the furrow openers are raised and the tractor turned a substantial amount, in either direction, the latch controlling mechanism 60 is actuated to reverse the latches which, when the furrow openers are again lowered into operating position, will hold the one marker in raised position and drop the other marker, automatically.

While I have shown and described above the preferred structure in which the principles of the present invention hav been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a towed planter adapted to be pulled by a tractor or the like and including a plurality of markers and marker raising and lowering means, individually operable latches for controlling the lowering of the markers, means adapted to be mounted on the tractor so as to move therewith relative to the planter and mechanism operatively connecting said last mentioned means with said latches, whereby turning of the tractor relative to the planter operates one or the other of said latches.

2. In a tractor propelled planter, the combination of marker controlling means on the planter, a turning bar connected to the tractor to turn with the latter relative to the planter, and means connecting said marker control means with said turning bar, whereby turning of the tractor relative to the planter, as at the end of the field, acts through said turning bar and said marker controlling means for controlling the markers.

3. In a tractor propelled planter of the type having furrow openers and markers adapted to be raised and lowered together, and individually controllable marker holding means, one for each of said marker, the combination of a turning bar adapted to be mounted on the tractor to turn therewith relative to the planter, and connections between said turning bar and said marker holding means for operating one or the other of the latter when the tractor is turned in one direction or the other relative to the planter.

4. In a tractor propelled planter of the type having a pair of marker arms and latch means for holding said marker arms in inoperative position, said arms being adapted to fall into operative position, when released, by the action of gravity, a turning bar adapted to be mounted in fixed relation on said tractor and to turn with the latter relative to the planter, and means connecting said turning bar with said latch means for operating the latter, said means including means operative when the tractor turns relative to the planter in one direction to operate said latch means to drop one of said marker arms and means operative when the tractor turns in the other direction relative to the planter to operate said latch means to drop the other of said marker arms.

5. In a tractor propelled planter, a marker arm, a latch for holding said arm in an elevated position, a part movable relative to the planter, means for fixing said part to the tractor so as to turn with the latter relative to the planter when the tractor turns with respect to the planter, and means connecting said part with said latch.

6. In a tractor propelled planter of the towed type, mechanism on the planter to be operated whenever the tractor turns beyond a given point relative to the planter, said mechanism including a part adapted to be moved in one direction whenever the tractor is turned relative to the planter in either direction, a turning member adapted to be fixed to the tractor to turn with the latter relative to the planter, a pair of rods pivotally connected at their front ends to opposite portions of said turning member, and means providing a slidable lost motion connection between the rear end of each of said rods and said part whereby turning of the tractor in either direction causes said part to be moved in said one direction.

7. In a tractor propelled planter of the towed type wherein the planter is adapted to be hitched to the drawbar of a tractor and the drawbar held against lateral swinging with respect to the tractor, the combination of marker control mechanism on the planter, a part adapted to be connected with the tractor for movement therewith in a generally horizontal plane relative to the planter when the tractor is turned relative to the planter, and means for connecting said part with said marker control mechanism whereby turning of the tractor relative to the planter operates said marker control mechanism.

8. In a tractor propelled planter of the type having a pair of markers, latch means for holding either or both of said markers in their elevated position, and marker control mechanism including a part movable in one direction for alternately operating said latch means, the combination therewith of a member connected with said part for moving the same in said one direction, a turning bar on the tractor connected to turn relative to the planter therewith, and a pair of links, each having a lost motion connection with said part and connected to be operated by said turning bar for shifting said part when the tractor turns relative to the planter in either direction.

9. In a towed planter adapted to be propelled by a source of power to which the planter is adapted to be connected for lateral turning movement, a marker arm connected at each side of the planter and adapted to be moved into and out of marking position alternately, means for lowering said markers alternately, means including a part movable relative to the planter and operatively connected with said propelling means so as to be responsive to the turning of the planter relative to the propelling means, and means connecting said part with said marker lowering means for actuating the latter by the turning of the planter relative to said propelling means.

10. In a tractor propelled planter, a pair of marker arms, a latch for holding each of said arms in an elevated position, mechanism for operating said latches alternately and including a longitudinally movable part adapted to operate first one latch and then the other, a member adapted to be connected with the tractor and movable relative to the planter in a generally forward direction in response to a turning of the tractor relative to the planter from a normal straight line draft, and means connecting said member and longitudinally movable part for operating said longitudinally movable part from said member in response to turning of the tractor relative to the planter.

11. In combination, a towed planter adapted to be connected to a tractor and to turn laterally relative to the latter and having a pair of generally vertically swingable marker arms, a part mounted on the tractor for movement in a forward direction when the tractor turns from normal straight line draft, and means whereby successive movements of said part in a forward direction cause said both marker arms to be moved successively into alternately opposite positions, movable means movable in response to the turning of the tractor relative to the planter, and means operatively connecting said turn-responsive means with said part for operating the latter for controlling said marker arms.

12. In combination, a towed planter adapted to be connected to a tractor and to turn laterally relative to the latter and having a pair of generally vertically swingable marker arms, a part mounted on the planter for movement in a forward direction when the tractor turns from normal straight line draft, latch means for controlling the position of said marker arms, means for operating said latch means by forward movements of said part, a member connected to turn with the tractor relative to the planter, and means connecting said member with said part whereby the latter is operated responsive to the turning of the tractor relative to the planter in either direction.

WILLIAM P. OEHLER.

REFERENCES CITED

The following references are of record in the file of this patent:

UNITED STATES PATENTS

| Number | Name | Date |
|---|---|---|
| 1,550,003 | Smith | Aug. 18, 1925 |
| 2,007,062 | Rapp et al. | July 2, 1935 |
| 2,296,209 | Kriegbaum et al. | Sept. 15, 1942 |
| 2,296,210 | Kriegbaum et al. | Sept. 15, 1942 |
| 2,296,216 | Lindgren | Sept. 15, 1942 |